United States Patent [19]
Tsujimoto et al.

[11] Patent Number: 5,308,703
[45] Date of Patent: May 3, 1994

[54] ADSORBENT HAVING GOOD HEAT CONDUCTIVITY

[75] Inventors: Soichiro Tsujimoto, Takaishi; Katsuya Kitaba, Takarazuka; Yoshinobu Otake, Osaka; Masao Hirayama; Habikino; Harushi Okabe, Amagasaki, all of Japan

[73] Assignee: Osaka Gas Company Limited, Osaka, Japan

[21] Appl. No.: 797,014

[22] Filed: Nov. 25, 1991

[30] Foreign Application Priority Data

Nov. 28, 1990 [JP] Japan .................. 2-331974

[51] Int. Cl.$^5$ .............. B32B 23/02; B32B 5/16; B01D 39/14
[52] U.S. Cl. ................... 428/408; 428/192; 428/283; 428/284; 428/244; 428/285; 428/186; 55/523; 55/524; 95/901; 96/153; 96/154
[58] Field of Search .............. 428/192, 283, 284, 244, 428/285, 408; 55/523, 524; 95/901; 96/153, 154

[56] References Cited

U.S. PATENT DOCUMENTS

| 3,608,610 | 9/1971 | Greatorex | 210/185 |
| 4,341,539 | 7/1982 | Gidaspow et al. | 55/208 |
| 4,674,563 | 6/1987 | Maier-Laxhuber | 165/104.12 |
| 4,996,102 | 2/1991 | Kyutoka et al. | 428/285 |

FOREIGN PATENT DOCUMENTS

| 0151786 | 8/1985 | European Pat. Off. . |
| 0260986 | 3/1988 | European Pat. Off. . |
| 3226502 | 2/1983 | Fed. Rep. of Germany . |
| 8601425 | 3/1986 | PCT Int'l Appl. . |
| 2165341 | 4/1986 | United Kingdom . |

OTHER PUBLICATIONS

Patent Abstracts of Japan, vol. 2, No. 76 (C-15)(849), Jun. 16 1978, & JP-A-53 030 488 (Nippon Shinku Gijutsu), Mar. 22, 1978.
Patent Abstracts of Japan, vol. 14, No. 488 (M-103, Oct. 24, 1990, & JP-A-2 197 739 (Daiken Trade), Aug. 6, 1990.

Primary Examiner—George F. Lesmes
Assistant Examiner—Kathryne E. Shelborne
Attorney, Agent, or Firm—Armstrong, Westerman, Hattori, McLeland & Naughton

[57] ABSTRACT

An adsorbent having high adsorption characteristics and high heat conductivity, which comprises a heat conductive sheet and at least one adsorbing sheet provided on at least one surface of the heat conductive sheet in contact therewith and which can perform a removal or supply of a heat through the heat conductive sheet to improve the adsorption or desorption efficiency, and an assembly comprising at least two adsorbents arranged in layers so as to form spaces between the adjacent adsorbents.

17 Claims, 3 Drawing Sheets

ADSORBENT HAVING GOOD HEAT CONDUCTIVITY

BACKGROUND OF THE INVENTION

The present invention relates to an adsorbent having an excellent adsorptivity and a high heat conductivity, and more particularly to an adsorbent comprising a sheet containing adsorbing agent and a heat conductive sheet.

Adsorbents composed of adsorbing sheets utilizing adsorbing agents are known. Conventional adsorbents cannot efficiently perform a heat removal in adsorption operation and a heat supply in desorption operation. Therefore, difficulties are encountered in conducting an adsorption treatment, particularly when substances to be adsorbed are present in high concentrations, or in conducting a desorption operation for desorbing the adsorbed substances from the adsorbents, particularly when a desorbing gas is supplied at a low linear velocity. That is to say, break through is easy to occur in adsorption treatment, because the temperature of an adsorbing agent included in the adsorbent rises due to the heat of adsorption, so the adsorptivity is lowered. On the other hand, in case of desorption operation, the temperature of the adsorbing agent remarkably drops due to heat removal by desorption, so the desorption characteristics are lowered.

It is an object of the present invention to provide an adsorbent having a high adsorptivity and a high heat conductivity.

A further object of the present invention is to provide a sheet-like adsorbent having a high adsorptivity and a high heat conductivity.

Another object of the present invention is to provide an adsorbent assembly comprising a plurality of sheet-like adsorbents, from which the heat of adsorption can be efficiently removed and to which a heat can be efficiently supplied so as to be able to efficiently conduct a desorption operation.

These and other objects of the present invention will become apparent from the description hereinafter.

SUMMARY OF THE INVENTION

It has been found that the drawbacks of conventional adsorbents can be eliminated and the above-mentioned objects can be achieved by combining an adsorbing sheet containing an adsorbing agent with a highly heat conductive sheet.

In accordance with the present invention, there is provided an adsorbent comprising at least one adsorbing sheet containing an adsorbing agent and a heat conductive sheet, said at least one adsorbing sheet being in contact with at least one surface of said heat conductive sheet.

The adsorbent of the present invention has excellent adsorption characteristics, a high heat conductivity and a high mechanical strength, and is useful for various purposes, e.g. separation of gases, removal or recovery of solvents, deodorization and other adsorption treatments. The adsorbent may be in the form of flat sheet, corrugated sheet or other desired shapes. An assembly comprising a plurality of the sheet-like adsorbents wherein the sheet-like adsorbents are arranged in layers so as to form spaces between them and the heat conductive sheets of the adsorbents are connected to heat removing and/or heat supplying means, can efficiently perform a heat removal and a heat supply and, therefore, it can be operated efficiently for adsorption even in fluids containing substances to be removed in a high concentration or for desorption even at a low linear velocity of a desorbing gas.

DETAILED DESCRIPTION

Figure 1:
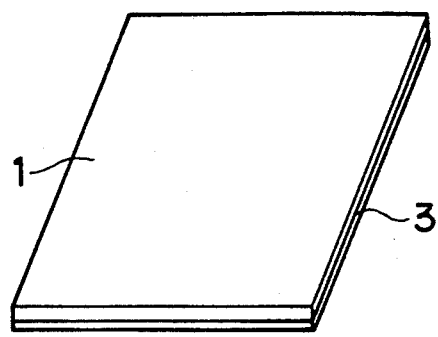
FIG. 1 is a schematic perspective view showing an embodiment of the adsorbent according to the present invention.

Any substances having an adsorbing ability can be used as the adsorbing agent to be included in the adsorbing sheet. Examples of the adsorbing agent are, for instance, activated carbon, silica gel, zeolite, activated alumina, a hygroscopic halide compound such as lithium chloride, calcium chloride, lithium bromide or calcium bromide, and other known adsorbing agents or materials. The adsorbing agents may be in any form, for example, in the form of fiber, powder or granule.

The adsorbing sheet containing an adsorbing agent can be prepared by various methods. For example, it may be prepared by forming a mixture of the adsorbing agent and an appropriate binder in an amount sufficient to bind the adsorbing agent in a suitable mold with or without applying a pressure into sheets or boards, and optionally further sintering the sheets or boards with or without applying a pressure. The mixture of the adsorbing agent and the binder may be directly sintered in a suitable mold at a high temperature under a pressure. The adsorbing sheet may also be prepared by a wet process, namely by dispersing a mixture of the adsorbing agent and the binder in water, mechanically agitating to give a uniform aqueous slurry, and then forming wet sheets from the slurry in a manner according to a paper making process, or placing the slurry in a mold and dehydrating to give wet sheets, and drying the wet sheets. In case of the sheet formation using a mold, there may also be adoptable a manner wherein a mold having suction holes and a suction means is placed in the aqueous slurry, the suction is conducted and the mold is taken out of the slurry. The thus formed sheets may be further sintered.

In the preparation of the adsorbing sheet, usual binders can be used, e.g., organic binders such as heat meltable resin binder, and inorganic binders. The binder is usually employed in an amount of 2 to 20 parts by weight per 100 parts by weight of the adsorbing agent. However, it is not always necessary to use the binder, if formed bodies or sintered bodies having a sufficient strength are obtained.

To the mixture of the adsorbing agent and the binder may be added at most about 80 parts by weight of a reinforcing material per 100 parts by weight of the adsorbing agent, as occasion demands. Representative examples of the reinforcing material are, for instance, a natural fiber such as hemp fiber or paper pulps, a synthetic resin fiber such as polyethylene fiber, polypropylene fiber or polyacrylonitrile fiber, and an inorganic fiber such as glass fiber.

Sheets or boards of activated carbon are preferred as the adsorbing sheet, e.g., sheets or boards of activated carbon, preferably activated carbon fiber, which may contain at most about 20 parts by weight of a binder per 100 parts by weight of the activated carbon and which are prepared by a wet or dry process, and the sintered products of these sheets or boards obtained by sintering the sheets or boards under a pressure at a high temperature.

The raw materials for activated carbon are not particularly limited, and activated carbons derived from various materials, e.g., coal, petroleum, phenol resin, polyacrylonitrile (PAN), cellulose, nut shells such as coconut husk, and wood, can be used in the present invention.

The activated carbon used in the present invention may be in any form, for example, in the form of fiber, granule or powder. A fibrous activated carbon material, namely activated carbon fiber, is particularly preferred, because non-sintered or sintered sheets having a high strength are obtained with the use of no binder or a less amount of a binder based on intertwinement of fibers and structural properties such as high strength in the fiber direction. Accordingly, it is desirable that a part or whole of the activated carbon used is an activated carbon fiber. The activated carbon fiber is not limited to particular one. An activated carbon fiber having a diameter of about 2 to about 30 $\mu$m, preferably 5 to 20 $\mu$m a length of about 0.05 to about 10 mm, microvoids or pores the radius of which is from about 5 to about 20 angstroms, and a specific surface area of about 500 to about 2500 $m^2/g$ is usually employed. As the powdered activated carbon, a fine powder having an average particle size of about 10 to about 100 $\mu$m and having a specific surface area of 300 to 2000 $m^2/g$ is preferably used from the viewpoint of adsorption and desorption characteristics.

In case of using the activated carbon fiber, the adsorbing sheet can be prepared by forming the fiber into a nonwoven fabric by a dry process as well as the wet process mentioned above.

In case of using a sintered body of activated carbon as the adsorbing sheet, it is prepared by forming the activated carbon alone or a uniform mixture of the activated carbon and a binder into a desired shape such as flat sheet or corrugated sheet by a dry or wet process, and then sintering the resulting formed product, or by directly sintering the activated carbon or the mixture thereof with a binder into a desired shape. The binder is used as occasion demands, and when single use of activated carbon provides a sintered body having a sufficient strength, there is no need to use the binder. The amount of the binder is selected from not more than 20 parts by weight, preferably from 2 to 20 parts by weight, per 100 parts by weight of the activated carbon.

Carbonaceous materials infusible under sintering conditions are preferably used as the binder for activated carbon. Representative examples of the binder used for activated carbon are, for instance, an infusibilized carbon, e.g., a stabilized, non-carbonized pitch (a pitch converted into an infusible form by a stabilization treatment according to a process for the production of pitch-based carbon fiber); a thermosetting resin such as aramid resin, phenol resin, epoxy resin or urea resin; and a thermoplastic resin converted into an infusible form by a heat treatment, e.g., an acrylic polymer or polyvinyl alcohol infusibilized according to a stabilization treatment in a process for the production of carbon fiber, but not carbonized. Unlike heat-meltable binders, these nonmeltable binders have the advantage of being hard to close the pores of activated carbon. Closing of the pores can be prevented in a higher degree, when the nonmeltable binder is used in the form of fiber, for instance, when an infusible intermediate fiber which is obtained in production of carbon fibers by a stabilization treatment of a pitch precursor fiber or a PAN precursor fiber, but not subjected to carbonization, is used as the binder. As the fibrous binders, there are preferred those having a diameter of about 5 to about 100 $\mu$m and a length of about 0.1 to about 5 mm.

A reinforcing material as mentioned above may be added to activated carbon or the mixture of activated carbon and binder, as occasion demands, in an amount up to about 80 parts by weight, preferably up to about 50 parts by weight, per 100 parts by weight of activated carbon.

The preparation of sintered sheets of activated carbon used as the adsorbing sheet in the present invention is explained below in more detail.

Activated carbon alone or a uniform mixture of activated carbon and a nonmeltable binder, to which a reinforcing material may be added, is placed in a suitable mold, formed with or without applying a pressure to previously provide a pre-formed sheet and then sintered, or is directly sintered in a mold without forming a pre-formed sheet, under a pressure of 5 to 1,000 $kgf/cm^2$, preferably 30 to 200 $kgf/cm^2$, at a temperature of 500° to 1,500° C., preferably 700° to 1,200° C. When the sintering pressure is less than 5 $kgf/cm^2$ and/or the sintering temperature is less than 500° C., the sintering is insufficient, thus providing only a sintered body having a low strength and a low density. On the other hand, when the sintering temperature is more than 1,500° C., change in shape of pores and decrease in specific surface area may occur, and also the proportion of the effective pores of activated carbon is decreased by closing of pores with a binder, thus the adsorption properties of the obtained sintered body tend to lower. When the sintering pressure is more than 1,000 $kgf/cm^2$, there is a fear that the pores of activated carbon are broken, so the adsorption properties of the obtained sintered body are lowered. The sintering time varies depending on the kind of activated carbon used, the shape of formed articles, and the kind and amount of binder, and is suitably selected in consideration thereof. Usually the sintering time is from about 5 seconds to 30 minutes.

When a fibrous activated carbon is used, a pre-formed sheet having a low density may be previously prepared by a dry or wet process, and then sintered under pressure and heating. The pre-formed sheet is placed in a mold and sintered under pressure and heating under the same conditions as above. In case of using activated carbon in the form of fiber, it may also be formed into a nonwoven fabric by a dry process, and then sintered in a mold under the same conditions as above. The use of pre-formed sheets makes the handling easy and prevents nonuniformity in density of sintered body. In particular, when the pre-formed sheet prepared by wet process is used, a sintered body having a more uniform distribution of density is obtained, since the variation in density of the pre-formed sheet is small.

A sintered sheet of activated carbon has a high density of not less than 0.3 g/cm$^3$, usually not less than 0.4 g/cm$^3$. Also, it is composed mainly of activated carbon, and accordingly the sintered sheet of activated carbon has an excellent adsorption activity and moreover a high strength and can be effectively used as the adsorbing sheet.

The thickness of the adsorbing sheet is suitably selected according to the uses. The thickness is usually selected from 0.05 to 5 mm, especially from 0.1 to 5 mm. If the adsorbing sheet is too thick, there is a possibility that the activated carbon present in the inside portion of the sheet is not effectively utilized for adsorption when applied to an adsorption treatment of liquids. On the other hand, if the adsorbing sheet is too thin, the adsorption characteristics are lowered because the absolute amount of the adsorbing agent in the sheet is decreased.

The heat conductive sheet to be laminated with the adsorbing sheet includes, for instance, a sheet or plate of a metal such as aluminum, copper, carbon steel or high alloy steel, a sheet or board of graphite, and other sheets or boards having a good heat conductivity. Aluminum sheets are particularly preferred because of having a highheat conductivity and being inexpensive. The aluminum sheets subjected to a surface treatment such as anodic oxidation treatment according to a usual process are used.

The thickness of the heat conductive sheet is preferably from about 0.02 to about 3 mm. When the heat conductive sheet is too thin, the heat conductivity characteristics of the adsorbent are lowered. On the other hand, the heat conductive sheet is too thick, the adsorption characteristics of the adsorbent are lowered, because the proportion of the adsorbing agent in the adsorbent of the invention is relatively decreased.

When fluids are treated with the adsorbent of the present invention to adsorb substances included in the fluids, the rise of temperature of the adsorbing sheet is prevented, thus the lowering of the adsorption properties is prevented, since the heat of adsorption is transferred through the heat conductive sheet to its edges and released there. Also, in the desorption of the adsorbed substances, when the temperature of the adsorbent of the present invention lowered below the atmospheric temperature due to the heat of desorption, it is possible to accelerate the desorption since a heat can be supplied to an adsorbing agent in the adsorbing sheet from the edges of the heat conductive sheet.

The heat conductive sheet also serves as a reinforcing or supporting layer or protective layer for the adsorbing sheet. In particular, when the adsorbing sheet is a sintered body, the heat conductive sheet effectively prevents the adsorbing sheet from damaging or breaking. Further, the heat conductive sheet serves to raise the shape retainability of the adsorbent, and prevents the breaking or deformation of the adsorbent.

The adsorbing sheet or sheets are adhered to at least one surface of the heat conductive sheet by known means, for example, by using an adhesive, or by a mechanical joining means such as grommet or rivet.

The present invention will be explained in detail with reference to the drawings.

As shown in FIG. 1, the adsorbent of the present invention basically comprises a liminated sheet composed of an adsorbing sheet 1 prepared as mentioned above and a heat conductive sheet 3 adhered to one surface of the sheet 1. The contact heat resistance is decreased by bringing the adsorbent sheet 1 into close contact with the heat conductive sheet 3. The adhesion between the sheets 1 and 3 may be made with an adhesive. It is desirable that the area to be applied with the adhesive is as small as possible in order to avoid the decrease in heat conduction between the sheets 1 and 3, so long as the both sheets can be firmly adhered. Known adhesives can be used, and those having a high heat conductivity are preferred.

Figure 9:
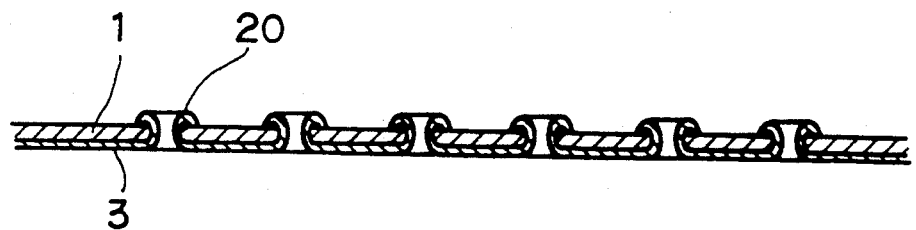
FIG. 9 is a section view showing a manner of joining an adsorbing sheet to a heat conductive sheet.

When the heat conductive sheet is a metal sheet, the adsorbing sheet may be adhered to the heat conductive sheet, as shown in FIG. 9, by forming a multiplicity of holes having a small diameter in a metal sheet 3 by means of a punch, and fixing an adsorbent sheet 1 with projected edges 20 formed by punching around the holes. In that case, an adhesive, preferably an adhesive having a high heat conductivity, may be further used in order to raise the contact, namely heat conductivity, between the adsorbing sheet 1 and the heat conductive sheet 3.

Figure 2:
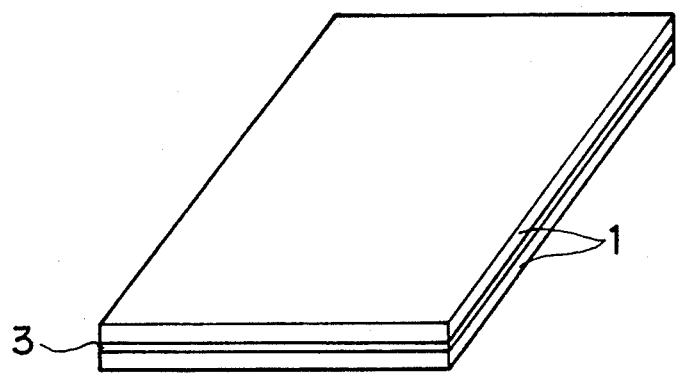
FIG. 2 is a schematic perspective view showing another embodiment of the adsorbent according to the present invention.

FIG. 2 shows another embodiment of the adsorbent of the present invention wherein both surfaces of a heat conductive sheet 3 are sandwiched with two adsorbing sheets 1. The adsorbent of this structure is preferable because it is possible to adsorb substances on both sides.

Figure 3:
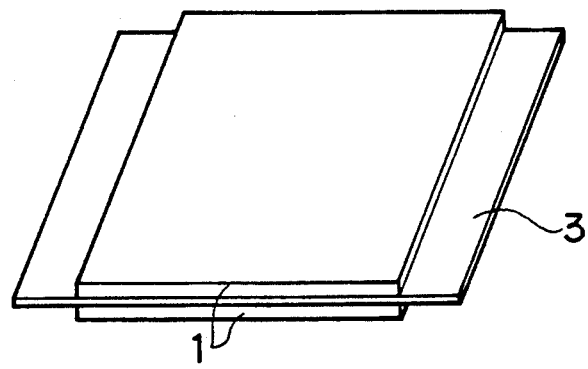
FIG. 3 is a schematic perspective view showing still another embodiment of the adsorbent according to the present invention.

In order to make it easy to conduct the heat releasing or heat removal and the heat supply from the edges of the heat conductive sheet 3, both edges of the heat conductive sheet 3 are preferably extended outside over the edges of the adsorbing sheets 1, as shown in FIG. 3.

Figure 4:
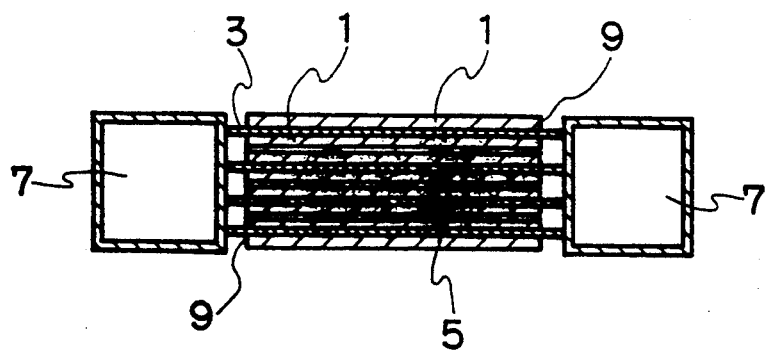
FIG. 4 is a section view showing an embodiment of the adsorbing device according to the present invention wherein the adsorbents shown in FIG. 3 are assembled so as to be able to cool or heat the adsorbents.

When it is desired to more efficiently conduct the removal or supply of heat through the heat conductive sheet 3, the extended edges of the heat conductive sheet 3 may be connected to heat removing and/or heat supplying means. FIG. 4 shows an embodiment of an assembly comprising a plurality of the adsorbent sheets and a heat exchanger 11. In FIG. 4, a plurality of adsorbents each comprising two adsorbing sheets 1 and heat conductive sheet 3 sandwiched with the two sheets 1, are built up at regular intervals with insertion of spacers 5 between the adsorbents, and the edges of the heat conductive sheet 3 of each of the adsorbents are connected to conduits 7 through which a heat medium for cooling or heating is passed. The both sides of the built-up adsorbent sheets, namely each side portion between two outwardly extending heat conductive sheets 3, are sealed by sealing members 9 in order to prevent a fluid to be passed for treatment through the spaces formed between the facing adsorbing sheets from flowing out through the side portions.

Figure 5:
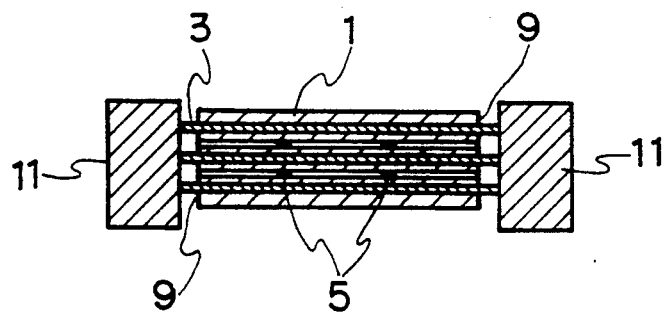
FIG. 5 is a section view showing another embodiment of the adsorbing device according to the present invention utilizing the adsorbents shown in FIG. 3 and capable of cooling and heating the adsorbents.

Also, as shown in FIG. 5, in order to supply a heat from the edges of the heat conductive sheets 3 to the adsorbing sheets 1, the extended edges of the heat conductive sheets may be connected to a material having a high heat capacity, e.g. a metal mass having a high weight. In this embodiment, too, the side portions of the adsorbing sheets 1 are sealed by sealing members 9.

Figure 6:
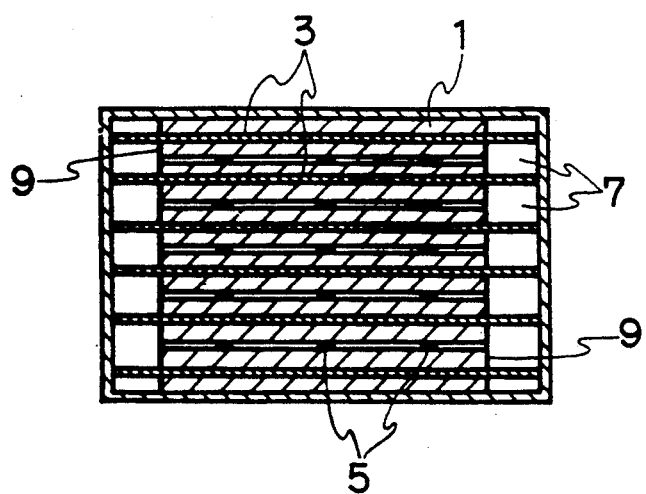
FIG. 6 is a section view showing still another embodiment of the adsorbing device according to the present invention utilizing the adsorbents shown in FIG. 3 and capable of cooling and heating the adsorbents.

FIG. 6 shows another embodiment of the assembly according to the present invention, wherein the built-up adsorbent sheets are provided with covers. The edges of the heat conductive sheets 3 are extended to the side covers through spaces formed between the side covers and the sealing members 9 to form small spaces 7. A heat medium for cooling or heating is passed through the spaces 7, thereby conducting a heat removal or heat supply through the heat conductive sheets 3.

Figure 7:
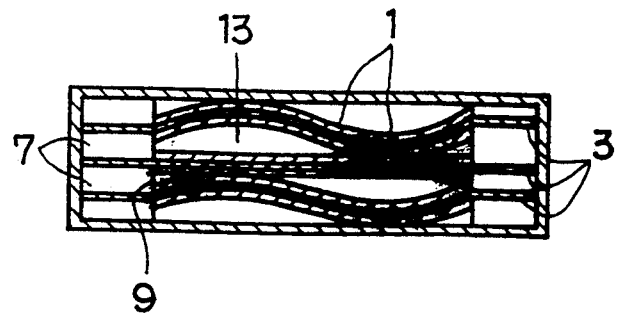
FIG. 7 is a section view showing another embodiment of the adsorbing device according to the present invention capable of cooling and heating the adsorbents wherein flat adsorbent sheets and corrugated adsorbent sheets are used in combination.

In case of treating a fluid such as a gas or a liquid utilizing the adsorbent of the present invention, a plurality of the sheet-like adsorbents are preferably arranged in layers so as to form a space between each adjacent adsorbents in order to decrease a pressure loss of the fluid. It is important to form the spaces in allowing a fluid such as gas or liquid containing a substance to be adsorbed to flow at a low pressure loss, thus in treating the fluid in a high efficiency. The manner of forming the spaces is not particularly limited. For example, as shown in FIG. 7, spaces 13 can be formed by alternately building up flat adsorbent sheets and corrugated adsorbent sheets. It is also possible to form spaces by preparing sheet-like adsorbents having a plurality of projections in a regular or random arrangement on their surfaces and building up the adsorbents, or by preparing sheet-like adsorbents having a plurality of dents and projections in a regular or random arrangement and building up them so as not to engage the dents and projections to each other, or by inserting spacers 5 having a predetermined height between the built-up flat adsorbent sheets as shown in FIGS. 4 to 6.

Figure 8:
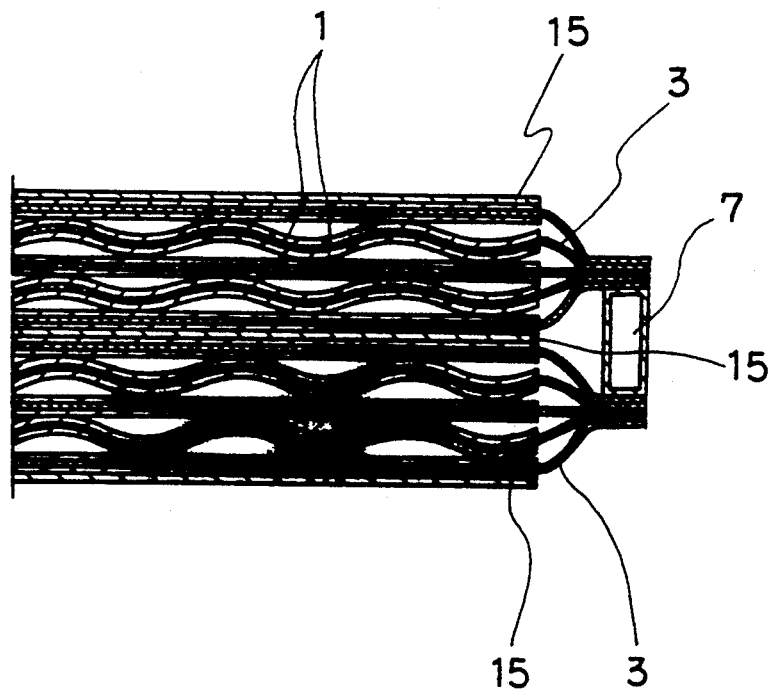
FIG. 8 is a section view showing still another embodiment of the adsorbing device according to the present invention capable of cooling and heating the adsorbents wherein flat adsorbent sheets and corrugated adsorbent sheets are used in combination.

FIG. 8 is a section view showing another embodiment of the assembly according to the present invention comprising flat adsorbent sheets, corrugated adsorbent sheets and heat exchanging means wherein the symmetrical left half of the assembly is not shown. The assembly as shown in FIG. 8 comprises a plurality of adsorbent units built-up. In each adsorbent unit, three flat adsorbent sheets and two corrugated adsorbent sheets each comprising two adsorbing sheets 1 and heat conductive sheet 3 sandwiched with the two sheets 1, are built-up alternately, and the respective built-up units are defined by partition sheets or boards 15. The edge portions of the heat conductive sheets 3 of each units extend outwardly, and are joined together and connected to heat exchanging means 7 through which a heat exchanging medium is passed for cooling or heating the adsorbing sheets 1.

The distance between adjacent two adsorbent sheets is not particularly limited and is suitably selected according to the conditions of use of the adsorbent and the like. It is desirable under consideration of the pressure loss and the length of the adsorbent that the distance between the adsorbent sheets is from 0.05 to 10 mm, especially 0.1 to 2 mm. If the distance between the adsorbent sheets is less than 0.05 mm, the pressure loss is large and the adsorbent is not practical. If the distance between the adsorbent sheets is more than 10 mm, substances to be adsorbed are easy to pass through the adsorbent sheets without contacting the adsorbent sheets, and the length of the adsorbent sheets must be increased when a higher adsorption effect is desired.

The sheet-like adsorbent and the adsorbent assembly of the present invention prepared by assembling the sheet-like adsorbents exhibit high adsorption properties, and can efficiently perform a removal of the heat of adsorption in treating fluids and a supply of a heat to the adsorbing agent in regenerating the adsorbent by desorption. Accordingly, it is possible to treat fluids containing substances to be adsorbed in a high concentration by removing the heat of adsorption through the heat conductive sheet of the adsorbent, and also to desorb the adsorbed substances with a desorbing gas fed at a low linear velocity by supplying a heat to the adsorbed substances through the heat conductive sheet. Further, since the heat conductive sheet serves to reinforce the adsorbing sheet and to raise the shape retainability of the adsorbent, the adsorbent and assembly of the present invention are excellent in mechanical strength and can maintain their excellent adsorption characteristics and flowing characteristics for a long term.

The adsorbent and assembly of the present invention are applicable to various purposes, e.g., water purification, gas purification, air purification, solvent and gasoline vapor recovery, decolorization and deodorization.

The present invention is more specifically described and explained by means of the following Examples in which all % and parts are by weight unless otherwise noted. It is to be understood that the present invention is not limited to the Examples.

EXAMPLE 1

In water were dispersed 94 parts of a pitch-based activated carbon fiber having a specific surface area of 2,000 $m^2/g$ (commercially available under the trade mark "A-20" from AD'ALL CO., LTD.) as an adsorbing agent and 6 parts of an infusibilized pitch fiber (product of DONAC CO., LTD.) as a binder. The fibers were beaten to give a uniform aqueous slurry of fibers approximately all of which had a length of not more than about 5 mm.

The slurry was then changed in a flat mold having a multiplicity of holes for suction at the bottom, and sucked to give a sheet-like shaped article having a basis weight of about 230 $g/m^2$. It was then dried to give a dried sheet having a density of about 0.1 $g/cm^3$.

The dried sheet was kept at 900° C. for 10 minutes with pressing at 200 $kgf/cm^2$ by a press to give a flat sintered sheet having a size of 100 mm × 100 mm × 0.44 mm and a density of 0.52 $g/cm^3$.

Also, a dried sheet having a density of about 0.1 $g/cm^3$ prepared in the same manner as above was placed in a mold having a corrugated cavity, and was kept at 900° C. for 30 minutes under a pressure of 200 $kgf/cm^2$ to give a sintered sheet having a thickness of 0.44 mm and a density of 0.52 $g/cm^3$ in a corrugated form wherein the difference between crest and trough was 0.3 mm and the distance between adjacent crests was 10 mm.

The thus prepared flat sheets and corrugated sheets had a sufficient strength, and there was no trouble in handling them. Also, the benzene equilibrium adsorption capacity of these sheets were about 70%, thus it was found that the original adsorption activity of the pitch-based activated carbon fiber was maintained nearly unchanged.

A flat aluminum sheet having a thickness of 0.1 mm was adhered to the flat sintered sheet with an adhesive in a point adhering manner to give a flat sheet-like adsorbent. Similarly, a corrugated aluminum sheet having a thickness of 0.1 mm which was obtained by press working using a corrugated press die, was adhered to the corrugated sintered sheet to give a corrugated sheet-like adsorbent.

The thus obtained flat adsorbent sheets and corrugated adsorbent sheets whose adsorbing sheets had a size of 100 mm × 100 mm, were built-up alternately in a height of 100 mm to provide an adsorption device having a structure as shown in FIG. 7. The packing density of the sintered sheets was 0.38 g/cm$^3$. The length of the horizontally extended edge portion of each of the aluminum sheets was 50 mm. The both side edges of the adsorbing sheets were sealed using an adhesive as a sealing material in order to prevent a leak of fluids to be treated, and the assembly of the built-up adsorbent sheets was covered to form spaces for passing a heat medium between the extended edge portions.

An adsorption device was further prepared in the same manner as above except that the extended portions of the aluminum sheets were not provided.

Using the thus prepared adsorption devices, the adsorption properties for benzene were measured under the following conditions with respect to (a) the case wherein air of 25° C. was passed through the heat medium passages at a superficial linear velocity of 1 m/second in parallel with the extended edge portions of the aluminum sheets in order to remove the heat of adsorption, (b) the case wherein the edge portions of the aluminum sheets were extended, but no air was passed, and )c) the case wherein the edges of the aluminum sheets were not extended.

Concentration of benzene: 1/10 saturated concentration at 25° C. (1.25%, diluted with nitrogen)
Linear velocity of gas to be treated (superficial velocity in column): 15 cm/second
Temperature of gas to be treated: 25° C.

The results of the adsorption test are as follows:

|  | (a) | (b) | (c) |
| --- | --- | --- | --- |
| 10% Break through time (min.) | 48.6 | 38 | 34 |
| 10% Break through adsorption quantity (g) | 170 | 134 | 120 |

From these results, it would be apparent that the adsorbent of the present invention having the extended edge portions of a heat conductive sheet has excellent adsorption characteristics. It would also be apparent that the gas adsorption effect can be raised when the heat of adsorption is removed through the heat conductive sheet.

COMPARATIVE EXAMPLE 1

Flat sintered sheets and corrugated sintered sheets were prepared in the same manner as in Example 1. Each set of two flat sheets and each set of two corrugated sheets were alternately built-up to provide an adsorption device having a size of 100 mm × 100 mm × 100 mm. The packing density of the sintered sheets was 0.40 g/cm$^3$.

The adsorption characteritics of the thus prepared adsorption device were measured in the same manner as in Example 1. The temperature of the sintered sheets elevated higher as compared with the device of Example 1.

The results are shown below.
10% Break through time: 29 minutes
10% Break through adsorption quantity: 101 g It would be apparent from these results that the adsorbent of Com. Ex. 1 having no heat conductive sheet is inferior in adsorption characteristics to the adsorbent of Example 1-c having a heat conductive sheet.

EXAMPLE 2

From an aqueous slurry containing 65 parts of the same pitch-based activated carbon fiber as used in Example 1, 27 parts of wood pulp and 8 parts of an acrylic polymer binder, a sheet was prepared according to a paper making process. The obtained sheet had a weight basis of 75 g/m$^2$, a thickness of 0.44 mm and a density of 0.17 g/cm$^3$. Also, the benzene equilibrium adsorption capacity of the sheet was 39%.

Using the thus prepared sheets, flat adsorbent sheets and corrugated adsorbent sheets having the aluminum heat conductive sheets were prepared and built-up alternately in the same manner as in Example 1 to provide an adsorption device having a structure as shown in FIG. 7. The packing density of the adsorbing sheet in the device was 0.13 g/cm$^3$.

The adsorption characteristics of the thus prepared adsorption device were measured in the same manner as in Example 1 with passing air of 25° C. at a superficial velocity of 1 m/second in order to remove the the heat of adsorption.

The results are shown below.
10% Break through time: 8.0 minutes
10% Break through adsorption quantity: 29.2 g

COMPARATIVE EXAMPLE 2

Flat adsorbent sheets and corrugated adsorbent sheets were prepared in the same manner as in Example 2 except that no aluminum sheet was used. Each set of two flat sheets and each set of two corrugated sheets were alternately built-up to provide an adsorption device. The packing density of the adsorbing sheet in the device was 0.137 g/cm$^3$.

The adsorption characteristics of the thus prepared adsorption device were measured in the same manner as in Example 1.

The results are shown below.
10% Break through time: 7.1 minutes
10% Break through adsorption quantity: 26.0 g About 10% decrease in adsorptivity is observed as compared with the adsorption device of Example 2.

EXAMPLE 3

From an aqueous slurry containing 55 parts of coconut husk activated carbon powder having a specific surface area of 1,450 m$^2$/g, 36 parts of wood pulp and 9 parts of an acrylic polymer binder, a sheet was prepared according to a paper making process. The obtained sheet had a weight basis of 60 g/m$^2$, a thickness of 0.21 mm and a density of 0.29 g/cm$^3$. Also, the benzene equilibrium adsorption capacity of the sheet was 24%.

An adsorption device having a structure as shown in FIG. 7 was prepared in the same manner as in Example 1 by adhering the obtained activated carbon sheets onto both surfaces of each of the flat and corrugated aluminum sheets with an adhesive in a point adhering manner, and building up the obtained flat adsorbent sheets and corrugated adsorbent sheets alternately. The packing density of the adsorbing sheet in the device was 0.20 g/cm$^3$.

The benzene adsorption characteristics of the thus prepared adsorption device were measured in the same manner as in Example 1 with passing air of 25° C. at a superficial velocity of 1 m/second in order to remove the heat of adsorption.

The results are shown below.

10% Break through time: 7.4 minutes
10% Break through adsorption quantity: 27.6 g

COMPARATIVE EXAMPLE 3

An adsorption device having a size of 100 mm×100 mm×100 mm was prepared in the same manner as in Example 3 except that no aluminum sheet was used, and sets of two flat activated carbon sheets and sets of two corrugated activated carbon sheets were alternately built-up.

The benzene adsorption characteristics of the device were measured in the same manner as in Example 1.

The results are shown below.

10% Break through time: 6.3 minutes
10% Break through adsorption quantity: 24.0 g About 13% decrease in adsorptivity is observed as compared with the adsorption device of Example 3.

In addition to the ingredients used in the Examples, other ingredients can be used in the Examples as set forth in the specification to obtain substantially the same results.

What we claim is:

1. An assembly for adsorption comprising at least two sheet-like adsorbents arranged in layers so as to form a space between the adjacent two sheets, each of said sheet-like adsorbents comprising a heat conductive sheet and at least one adsorbing sheet containing an adsorbing agent and being provided on at least one surface of said heat conductive sheet in contact therewith, said adsorbing sheet being a sintered body of activated carbon and having a density of not less than 0.4 g/cm$^3$.

2. The assembly of claim 1, wherein said at least two sheet-like adsorbents are in a corrugated sheet form.

3. The assembly of claim 1, wherein said sheet-like adsorbents are in the forms of flat sheet and corrugated sheet, and at least one flat sheet and at least one corrugated sheet are alternately built-up.

4. The assembly of claim 1, wherein said heat conductive sheet is a metal sheet.

5. The assembly of claim 1, wherein said adsorbing sheet is a sintered product prepared from a composition comprising activated carbon or a mixture of activated carbon and a carbonaceous binder material.

6. The assembly of claim 1, wherein said adsorbing sheet is a sheet containing activated carbon prepared in a wet paper making manner followed by drying and sintering under pressure.

7. The assembly of claim 1, wherein at least one edge of said heat conductive sheet is extended over the edge of said adsorbing sheet.

8. The assembly of claim 1, wherein at least one edge of said heat conductive sheet is extended outwardly over the edge of said adsorbing sheet and is connected to a heat exchanging means or a member having a high heat capacity.

9. The assembly of claim 1, wherein at least one edge of said heat conductive sheet is extended outwardly over the edge of said adsorbing sheet, and each of the side protions of the adsorbing sheets and heat conductive sheets of the layered adsorbents is covered with a covering member so as to form passages which are defined by the covering members and the adjacent extended edge portions of said heat conductive sheets and through which a heat medium is passed along the extended edge portions.

10. The assembly of claim 2, wherein at least one edge of said heat conductive sheet is extended over the edge of said adsorbing sheet.

11. The assembly of claim 3, wherein at least one edge of said heat conductive sheet is extended over the edge of said adsorbing sheet.

12. The assembly of claim 4, wherein at least one edge of said heat conductive sheet is extended over the edge of said adsorbing sheet.

13. The assembly of claim 5, wherein at least one edge of said heat conductive sheet is extended over the edge of said adsorbing sheet.

14. The assembly of claim 5, wherein the composition further includes a reinforcing material.

15. The assembly of claim 6, wherein at least one edge of said heat conductive sheet is extended over the edge of said adsorbing sheet.

16. An assembly for adsorption comprising at least two sheet-like adsorbents arranged in layers so as to form a space between the adjacent two sheets, each of said sheet-like adsorbents comprising a heat conductive sheet and at least one adsorbing sheet containing an adsorbing agent and being provided on at least one surface of said heat conductive sheet in contact therewith, and said adsorbing sheet being a sintered body of activated carbon and having a density of not less than 0.3 g/cm$^3$.

17. The assembly of claim 16, wherein at least one edge of said heat conductive sheet is extended over the edge of said adsorbing sheet.

* * * * *